(12) United States Patent
Su et al.

(10) Patent No.: US 10,232,515 B2
(45) Date of Patent: Mar. 19, 2019

(54) DEVICE FOR TRANSFERRING HUB GROUND CHAIN TRAY

(71) Applicant: CITIC Dicastal CO., LTD, Qinhuangdao (CN)

(72) Inventors: Jinbao Su, Qinhuangdao (CN); Hongtao Wang, Qinhuangdao (CN); Zhiwei Qin, Qinhuangdao (CN); Huanming Ma, Qinhuangdao (CN); Zhiliang Zhang, Qinhuangdao (CN); Zaide Wang, Qinhuangdao (CN); Yongwang Zhao, Qinhuangdao (CN)

(73) Assignee: CITIC DICASTAL CO., LTD (CN)

( * ) Notice: Subject to any disclaimer, the term of this patent is extended or adjusted under 35 U.S.C. 154(b) by 112 days.

(21) Appl. No.: 15/605,495

(22) Filed: May 25, 2017

(65) Prior Publication Data

US 2018/0243925 A1   Aug. 30, 2018

(30) Foreign Application Priority Data

Feb. 25, 2017  (CN) .......................... 2017 1 0105131

(51) Int. Cl.
*B25J 15/02* (2006.01)
*B25J 15/00* (2006.01)
*B05B 13/02* (2006.01)

(52) U.S. Cl.
CPC ......... *B25J 15/0028* (2013.01); *B25J 15/022* (2013.01); *B05B 13/0264* (2013.01)

(58) Field of Classification Search
CPC .. B25J 15/0028; B25J 15/022; B25J 15/0266; B05B 13/0264

USPC ................... 294/207, 202, 115, 198
See application file for complete search history.

(56) References Cited

U.S. PATENT DOCUMENTS

| | | | | |
|---|---|---|---|---|
| 3,512,824 A | * | 5/1970 | Bautz | B21D 43/10 294/115 |
| 4,892,344 A | * | 1/1990 | Takada | B25J 15/0266 294/119.1 |
| 5,588,688 A | * | 12/1996 | Jacobsen | A61F 2/588 294/106 |
| 5,975,605 A | * | 11/1999 | Kot | B25B 5/122 269/224 |
| 6,361,095 B1 | * | 3/2002 | Attee | B25B 5/087 294/119.1 |
| 2002/0079713 A1 | * | 6/2002 | Moilanen | B25B 5/087 294/198 |
| 2003/0116985 A1 | * | 6/2003 | Moilanen | B25B 5/087 294/207 |

(Continued)

*Primary Examiner* — Gabriela M Puig
(74) *Attorney, Agent, or Firm* — Calfee, Halter & Griswold LLP

(57) ABSTRACT

A device for transferring a hub ground chain tray. An upper slider and a lower slider parallel to each other are arranged at the head end, a cylinder mounting plate is arranged below the upper and lower sliders, a cylinder is arranged below the cylinder mounting plate, a slider is arranged at the end of a piston rod of the cylinder, the left and right sides of the slider are provided with rotating pins, the two ends of the rotating pins can be installed in the strip through holes respectively in a sliding manner, and the two rotating pins are connected with the tail of the clamping jaw; the head of the clamping jaw is provided with jaw fingers, the jaw fingers are provided with the clamping blocks, and a transferrable tray device is arranged between the clamping blocks.

4 Claims, 3 Drawing Sheets

(56) References Cited

U.S. PATENT DOCUMENTS

| | | | |
|---|---|---|---|
| 2013/0088031 A1* | 4/2013 | Jones | G01N 35/0099 294/203 |
| 2013/0249229 A1* | 9/2013 | Roberts | B25J 15/0226 294/198 |
| 2014/0117690 A1* | 5/2014 | Itoh | G01N 35/0099 294/198 |
| 2014/0232124 A1* | 8/2014 | Dan | B25J 15/0009 294/198 |

* cited by examiner

DEVICE FOR TRANSFERRING HUB GROUND CHAIN TRAY

CROSS-REFERENCE TO RELATED APPLICATIONS

This application claims priority to Chinese Patent Application No. 201710105131.X, filed on Feb. 25, 2017, which is hereby incorporated by reference in its entirety.

TECHNICAL FIELD

The present application relates to a transport device, and belongs to the field of hub spraying technology.

BACKGROUND ART

In the traditional spraying mode of an aluminum alloy hub, the hub is transferred from a hanging chain to a ground chain first, and the hub passes through a spraying operation room together with the ground chain and then enters an oven for baking. The ground chain is soaked into paint for long time in this spraying mode, leading to aggravation of chain blockage and oven dust. The latest spraying mode avoids the above two problems by adopting a spraying ground chain and an oven ground chain independent from each other, transferring the hub sprayed on the spraying ground chain to the oven ground chain and then feeding the hub into an oven. However, no matter in manual or mechanical transfer, the transfer operation leads to direct contact of the hub paint surface in a wet film state, and inevitably damages the hub paint surface; and with increasingly high requirement of customers for product quality, a new transfer method and equipment system are urgently needed to realize traceless transfer of a hub in a wet film state.

SUMMARY OF THE INVENTION

Aiming at the above shortcomings of the prior art, the subject matter provides a device for transferring a hub ground chain tray.

The technical solution for solving the technical problems adopted in the present application is that a device for transferring a hub ground chain tray includes a clamping jaw, an upper slider, a lower slider, a cylinder mounting plate, a rotating pin A, a rotating pin B, a rotating pin C, a connecting sheet, a slider, a connecting block, shim blocks, a bushing baffle, jaw fingers, clamping blocks, an angle bracket, a flange mounting seat, a bushing A, a bushing B and a cylinder.

The upper slider and the lower slider parallel to each other are arranged at the head end of the device of the present application, the left and right sides of the upper slider and the lower slider are symmetrically provided with strip through holes, the cylinder mounting plate is arranged below the upper slider and the lower slider, the cylinder is arranged below the cylinder mounting plate, the slider is arranged at the end of a piston rod of the cylinder, the left and right sides of the slider are provided with the rotating pin B and the rotating pin C, the two ends of the rotating pin B and the rotating pin C can be installed in the strip through holes, and the rotating pin B is connected with the tail of the clamping jaw via a link mechanism; the head of the clamping jaw is provided with the jaw fingers, the jaw fingers are provided with the clamping blocks, and a transferrable tray device is arranged between the clamping blocks.

Further, the rotating pin B is connected with one end of the connecting sheet, the other end of the connecting sheet is connected with the tail of the clamping jaw via the rotating pin B, and the middle part of the clamping jaw is installed between the upper and lower sliders via the rotating pin A.

Further, the clamping jaw is installed at the head of a robot via the flange mounting seat.

Further, the middle part of the clamping jaw is connected to the rotating pin B and the rotating pin C, and the shim blocks are provided between the clamping jaw and the upper slider, and between the clamping jaw and the lower slider respectively.

The subject matter has the advantages: the clamping jaw is installed at the head of the robot via the flange mounting seat, and traceless transfer of a wet-film hub is realized by grabbing a transferrable tray with an appropriate structure, so that the quality of a hub spraying product is improved.

DETAILED DESCRIPTION OF THE INVENTION

The present application will be further described in detail below in combination with embodiments and the accompanying drawings.

Figure 1:
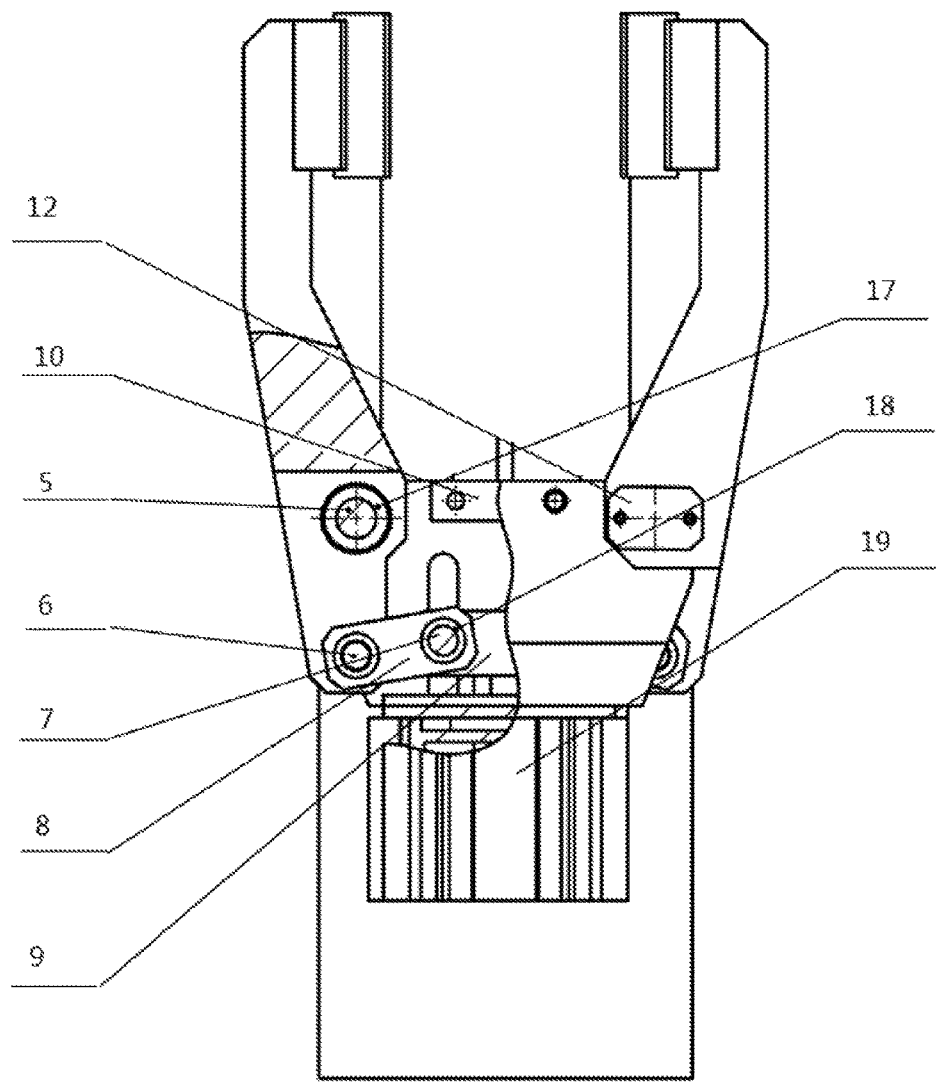
FIG. 1 is a front view of the present application.
Figure 2:
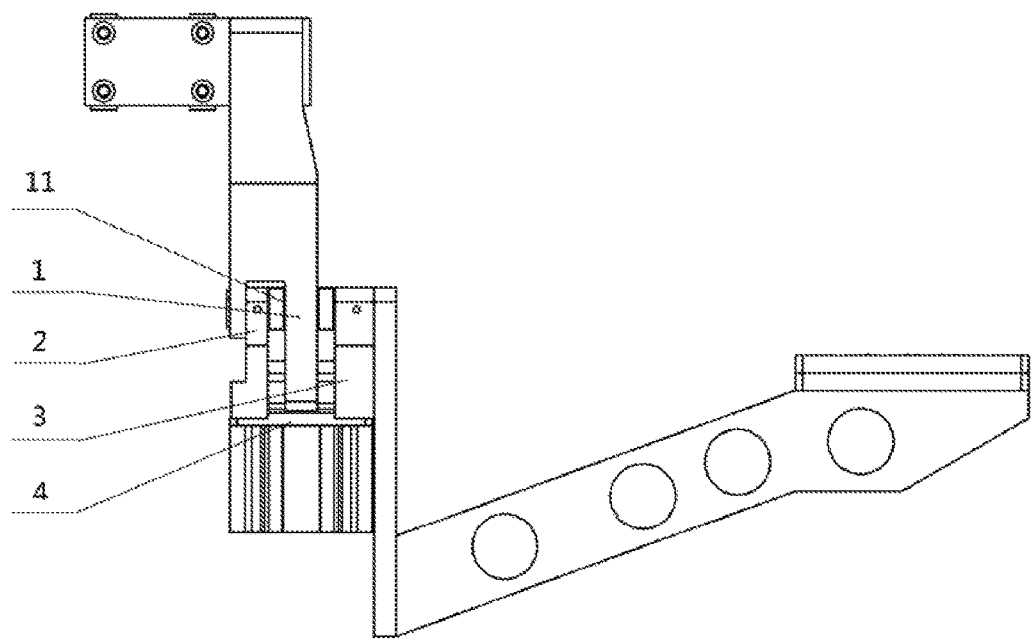
FIG. 2 is a right view of the present application.
Figure 3:
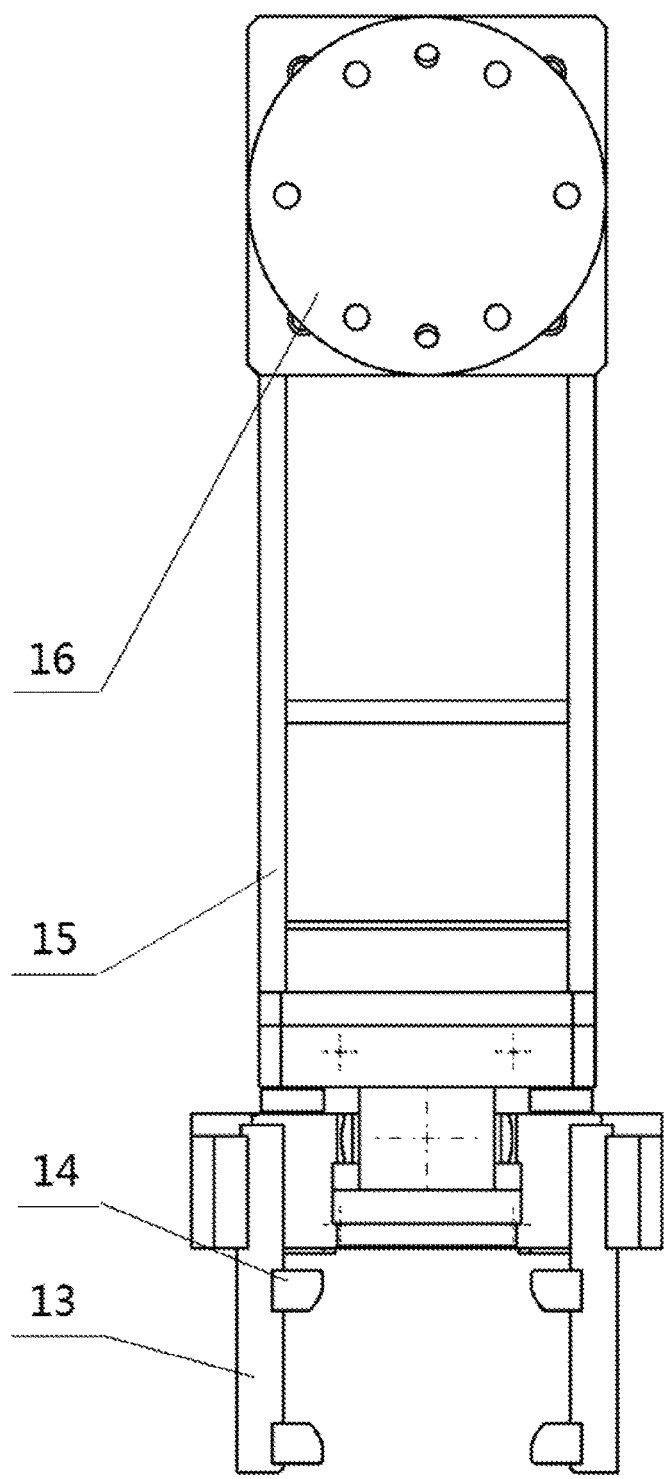
FIG. 3 is a top view of the present application.
In figures: 1—clamping jaw, 2—upper slider, 3—lower slider, 4—cylinder mounting plate, 5—rotating pin A, 6—rotating pin B, 7—rotating pin C, 8—connecting sheet, 9—slider, 10—connecting block, 11—shim block, 12—bushing baffle, 13—jaw finger, 14—clamping block, 15—angle bracket, 16—flange mounting seat, 17—bushing A, 18—bushing B, 19—cylinder.

As shown in FIGS. 1, 2 and 3, a device for transferring a hub ground chain tray includes a clamping jaw 1, an upper slider 2, a lower slider 3, a cylinder mounting plate 4, a rotating pin A 5, a rotating pin B 6, a rotating pin C 7, a connecting sheet 8, a slider 9, a connecting block 10, shim blocks 11, a bushing baffle 12, jaw fingers 13, clamping blocks 14, an angle bracket 15, a flange mounting seat 16, a bushing A 17, a bushing B 18 and a cylinder 19.

The upper slider 2 and the lower slider 3 parallel to each other are arranged at the head end of the device, the left and right sides of the upper slider 2 and the lower slider 3 are symmetrically provided with strip through holes, the cylinder mounting plate 4 is arranged below the upper slider 2 and the lower slider 3, and the cylinder 19 is arranged below the cylinder mounting plate 4. The slider 9 is arranged at the end of a piston rod of the cylinder, the left and right sides of the slider 9 are provided with the rotating pin B 6 and the rotating pin C 7, the two ends of each of the rotating pin B 6 and the rotating pin C 7 can be installed in the strip through holes, the rotating pin B 6 is connected with one end of the connecting sheet 8, the other end of the connecting sheet 8 is connected with the tail of the clamping jaw 1 via the rotating pin B 6, and the middle part of the clamping jaw 1 is installed between the upper slider 2 and the lower slider 3 via the rotating pin A 5.

The head of the clamping jaw 1 is provided with the jaw fingers 13, the jaw finger 13 are provided with the clamping blocks 14, and a transferrable tray is arranged between the clamping blocks 14.

The clamping jaw 1 is installed at the head of a robot via the flange mounting seat 16.

The middle part of the clamping jaw 1 is connected to the upper slider 2 and the lower slider 3 through the rotating pin A 5, and the shim blocks 11 are provided between the clamping jaw 1 and the upper slider 2, and between the clamping jaw 1 and the lower slider 3 respectively.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for transferring a hub ground chain tray, comprising a clamping jaw, an upper slider, a lower slider, a cylinder mounting plate, a rotating pin A, a rotating pin B, a rotating pin C, a connecting sheet, a slider, a connecting block, shim blocks, a bushing baffle, jaw fingers, clamping blocks, an angle bracket, a flange mounting seat, a bushing A, a bushing B and a cylinder, wherein the upper slider and the lower slider parallel to each other are arranged at the head end of the device, the left and right sides of the upper slider and the lower slider are symmetrically provided with strip through holes, the cylinder mounting plate is arranged below the upper slider and the lower slider, the cylinder is arranged below the cylinder mounting plate, the slider is arranged at the end of a piston rod of the cylinder, the left and right sides of the slider are provided with the rotating pin B and the rotating pin C, the two ends of the rotating pin B and the rotating pin C are configured to be installed in the strip through holes, and the rotating pin B is connected with the tail of the clamping jaw via a link mechanism; the head of the clamping jaw is provided with the jaw fingers, the jaw fingers are provided with the clamping blocks, and a transferrable tray device is arranged between the clamping blocks.

2. The device for transferring a hub ground chain tray as described in claim 1, wherein the rotating pin B is connected with one end of the connecting sheet, the other end of the connecting sheet is connected with the tail of the clamping jaw via the rotating pin B, and the middle part of the clamping jaw is installed between the upper and lower sliders via the rotating pin A.

3. The device for transferring a hub ground chain tray as described in claim 1, wherein the clamping jaw is installed at the head of a robot via the flange mounting seat.

4. The device for transferring a hub ground chain tray as described in claim 1, wherein the middle part of the clamping jaw is connected to the rotating pin B and the rotating pin C, and the shim blocks are provided between the clamping jaw and the upper slider, and between the clamping jaw and the lower slider respectively.

* * * * *